Figure 1:
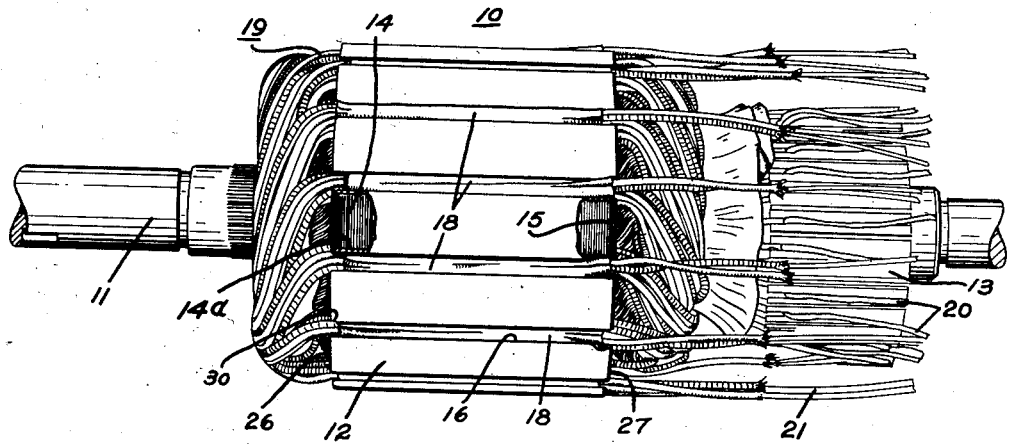

Feb. 19, 1935.  A. W. PHELPS  1,991,696

ARMATURE AND METHOD OF MANUFACTURE

Filed July 21, 1933

INVENTOR
ALVA W. PHELPS
BY
Spencer Hardman & Fehr
his ATTORNEYS

Patented Feb. 19, 1935

1,991,696

UNITED STATES PATENT OFFICE 1,991,696

ARMATURE AND METHOD OF MANUFACTURE

Alva W. Phelps, Anderson, Ind., assignor, by mesne assignments, to General Motors Corporation, Detroit, Mich., a corporation of Delaware Application July 21, 1933, Serial No. 681,434

5 Claims. (Cl. 171—206)

This invention relates to the manufacture of armatures and more particularly to the prevention of short circuits between form wound coils in armatures.

In the winding of form wound coils of generally rectangular shape it frequently happens that the insulation of the wires along the four coil bends suffers slight and sometimes undetectable damage due to the abrupt bending of the wire around the bends of the winding form. In order to obtain a compact and lasting assembly of armature core and form wound armature coils, it is imperative that the coils are considerably stretched in order snugly to fit into their assigned armature core slots. The coil bends are thereby again abruptly bent around the comparatively sharp edges of the core slot entrances thus giving rise to further damage to the insulation along the coil bends. The result is frequently one or more short circuits between armature coils caused by the contact of bared wires of adjacent coil bends.

It is an object of the present invention to prevent short circuits between the bends of form wound armature coils in spite of their unavoidable stretching for deposition into their assigned armature core slots.

It is a further object of the present invention to obtain armatures, the form wound coils of which are more firmly packed than heretofore.

Further objects and advantages of the present invention will be apparent from the following description, reference being had to the accompanying drawing wherein a preferred embodiment of one form of the present invention is clearly shown.

In the drawing:

Fig. 1 discloses an armature with ropes of insulating material intertwined between end portions of the assembled armature coils.

Figure 2:
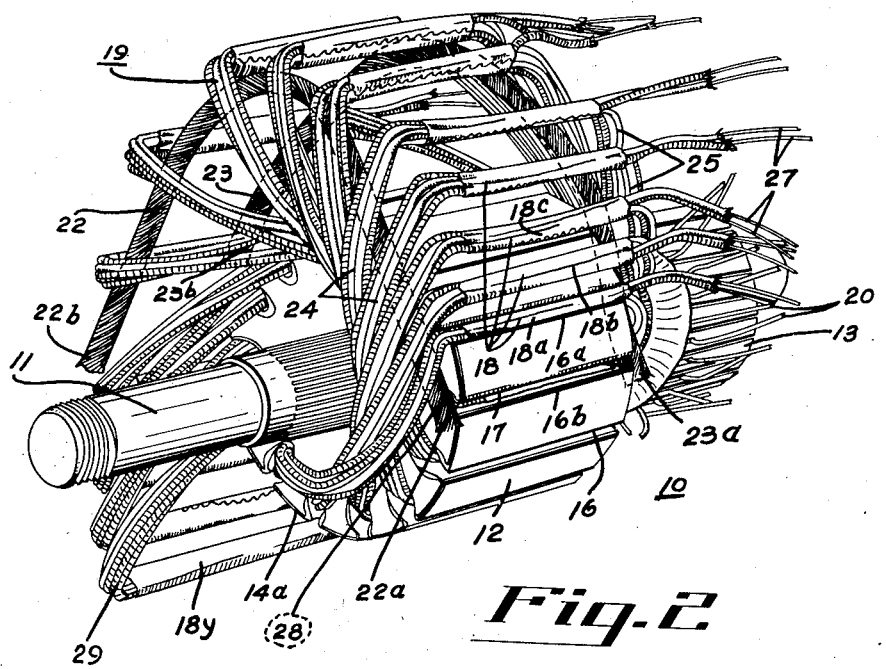

Fig. 2 discloses an armature with semi-assembled armature coils and the properly positioned insulating ropes before they are intertwined between end portions of the armature coils.

Referring to the drawing and particularly to Fig. 1, there is illustrated an armature 10 consisting of an armature shaft 11, an armature core 12 and a commutator 13. The armature core 12 which is made up of laminations 14 and insulating end discs 15 is also provided with a plurality of slots 16 adapted to receive the active sides 17 and 18 of form wound armature coils 19, having leads 20 and 21 adapted to be assembled in any practiced manner but in a predetermined order with the bars of commutator 13.

In order effectively to prevent short circuits between armature coils which are caused by torn insulation along the coil bands as earlier explained, pre-cut lengths of rope 22 and 23 of any suitable insulating material such as paper are interposed between the end portions 24 and 25 of the coils and the core 12 in a manner to be described presently. First, the active sides 17 of all coils are placed into the core slots 16 by a special tool or machine, such as for example the coil positioning machine disclosed in the patent to J. F. Cullin No. 1,402,217. Thereafter an operator threads each rope 22 and 23 between the coil end portions 24, 25 and end faces 26, 27 respectively, of the armature core 12, as illustrated in Fig. 2 wherein the paper ropes are shown properly positioned with respect to the coils and ready to be intertwined. Preferably the unplaced active coil side 18a is then forced into a core slot 16a which is adjacent the ends 22a and 23a of the ropes 22, 23, respectively. It can be readily understood that during the forcing of said active coil side 18a into core slot 16a by the coil positioning machine mentioned by way of example, the two ropes 22 and 23 are each squeezed between two adjacent coil bends which connect the underlying active coil side 17 in core slot 16 and the overlying coil side 18a in the same core slot with their coil ends, thereby separating these coil bends and thus preventing any contacting between the wires thereof. The thus interposed rope portions furthermore space the coil bends, connecting the overlying active coil side 18a with its coil ends, from the core so that these coil bends which are adjacent the sharp end corners of the core slot entrance do not bend around such sharp corners. Successive active coil sides 18b, 18c etc., are forced into successive core slots 16, and with every deposited active coil side 18 the paper ropes become more intertwined until the last coil side 18y, while being placed into the last core slot 16b, squeezes the ends 22b and 23b of the ropes 22 and 23, respectively, between the coil bends 28, 29 adjacent core end face 26 and the analogous coil bends adjacent core end face 27. In conclusion, the ropes 22 and 23 not only space superposed coil bends from each other, thereby preventing contact between eventually bared wires of said coil bends, and prevent the coil bends closest to the periphery of the armature core from becoming bent abruptly around the sharp edges 30 of the core slot entrances during the deposition of the coils into the core slots, but these ropes furthermore form a yieldable cushion against which the coil bends are urged during the insertion of the active coil sides into the core slots thereby packing the active sides of the coils adjacent the periphery of the core more firmly into the core slots as can be readily understood. Centrifugal force, caused by the rotation of the armature, therefore has a less devastating influence upon the ends of the armature coils than hitherto without the mentioned cushion. In the present instance the coil leads 20 which emerge from the first deposited coil sides 17 are shown secured within notches 30 in the commutator bars before the paper is intertwined, however, it is of no consequence in what manner and at what time the coil leads 20 and 21 are secured to the commutator bars.

While the form of embodiment of the present invention as herein disclosed, constitutes a preferred form, it is to be understood that other forms might be adopted, all coming within the scope of the claims which follow.

What is claimed is as follows:

1. An armature including a slotted core and armature coils assembled therewith, in combination with a rope of insulating material interposed between end portions of the armature coils and the core.

2. An armature including a slotted core and armature coils assembled therewith, in combination with a rope of insulating material interposed between end portions of the armature coils and the core in close proximity to the core slots.

3. An armature including a core having slots in which the active sides of armature coils are disposed, in combination with ropes of insulating material interposed between the core and those coil bends which are closest to the periphery of the core.

4. An armature including a core having slots in which the active sides of armature coils are disposed, in combination with ropes of insulating material interposed between coil bends directly merging with active coil sides located in the bottoms of the core slots and coil bends directly merging with active coil sides located in the upper portions of the slots.

5. An armature including a core having slots in which the active sides of armature coils are disposed, in combination with ropes of insulating material interposed between coil bends directly merging with active coil sides located in the bottoms of the core slots and coil bends directly merging with active coil sides located in the upper portions of the slots, and between all of the latter coil bends and the core.

ALVA W. PHELPS.